United States Patent [19]
Hirose et al.

[11] Patent Number: 6,120,223
[45] Date of Patent: Sep. 19, 2000

[54] COVER DEVICE FOR MACHINE TOOL

[75] Inventors: Yoshiro Hirose, Gifu-ken; Akitoshi Sato, Aichi-ken, both of Japan

[73] Assignee: Howa Machinery, Ltd., Aichi-Ken, Japan

[21] Appl. No.: 09/387,700

[22] Filed: Aug. 30, 1999

[30] Foreign Application Priority Data

Sep. 3, 1998 [JP] Japan .................................. 10-249458

[51] Int. Cl.⁷ ...................................................... B23C 9/00
[52] U.S. Cl. .................................... 409/134; 29/DIG. 56; 29/DIG. 59
[58] Field of Search ..................................... 409/134, 135, 409/235; 408/234, 56; 29/DIG. 56, DIG. 59; 49/260, 261, 156, 157

[56] References Cited

U.S. PATENT DOCUMENTS

| | | | |
|---|---|---|---|
| 752,413 | 2/1904 | Pitt et al. ................................... | 49/260 |
| 1,169,143 | 1/1916 | Furlong ..................................... | 49/260 |
| 2,296,144 | 9/1942 | Cohen ....................................... | 49/260 |
| 2,335,232 | 11/1943 | Boughton et al. ......................... | 49/260 |
| 4,416,482 | 11/1983 | Patterson .................................. | 296/24 |
| 4,950,113 | 8/1990 | Winkler et al. ........................... | 409/134 |
| 4,999,895 | 3/1991 | Hirose et al. ............................. | 29/33 P |
| 5,152,645 | 10/1992 | Corsi ........................................ | 409/235 |
| 5,178,499 | 1/1993 | Umeda et al. ............................. | 409/134 |
| 5,181,898 | 1/1993 | Piotrowski ................................. | 483/3 |
| 5,624,363 | 4/1997 | Kuriki ........................................ | 483/3 |
| 5,662,568 | 9/1997 | Lindem ...................................... | 483/30 |
| 5,893,690 | 4/1999 | Haninger ................................... | 409/134 |
| 5,915,897 | 6/1999 | Reynolds ................................... | 409/134 |

FOREIGN PATENT DOCUMENTS

| | | | |
|---|---|---|---|
| 0223970 | 6/1985 | Germany ................................ | 409/134 |
| 0062636 | 3/1988 | Japan ..................................... | 409/134 |
| 2527920 | 8/1995 | Japan . | |
| 9-225777 | 9/1997 | Japan . | |
| 10-138085 | 5/1998 | Japan . | |
| 1071396 | 2/1984 | U.S.S.R. ................................. | 409/134 |

*Primary Examiner*—Andrea L. Pitts
*Assistant Examiner*—Andrian M. Wilson
*Attorney, Agent, or Firm*—Ladas & Parry

[57] ABSTRACT

A machine tool has a base, a Z-axis slide base capable of longitudinal movement on the base, and a column mounted on the slide base so as to be transversely movable on the slide base. Right and left cover plates, with respect to transverse directions, each formed by folding a single plate have inner ends connected by hinges to the column and outer ends connected by hinges to carriages guided for longitudinal movement by guide rails so as to divide spaces on the right and the left side of the column into front and rear parts. The cover plates turns on the hinges as the column moves transversely.

6 Claims, 8 Drawing Sheets

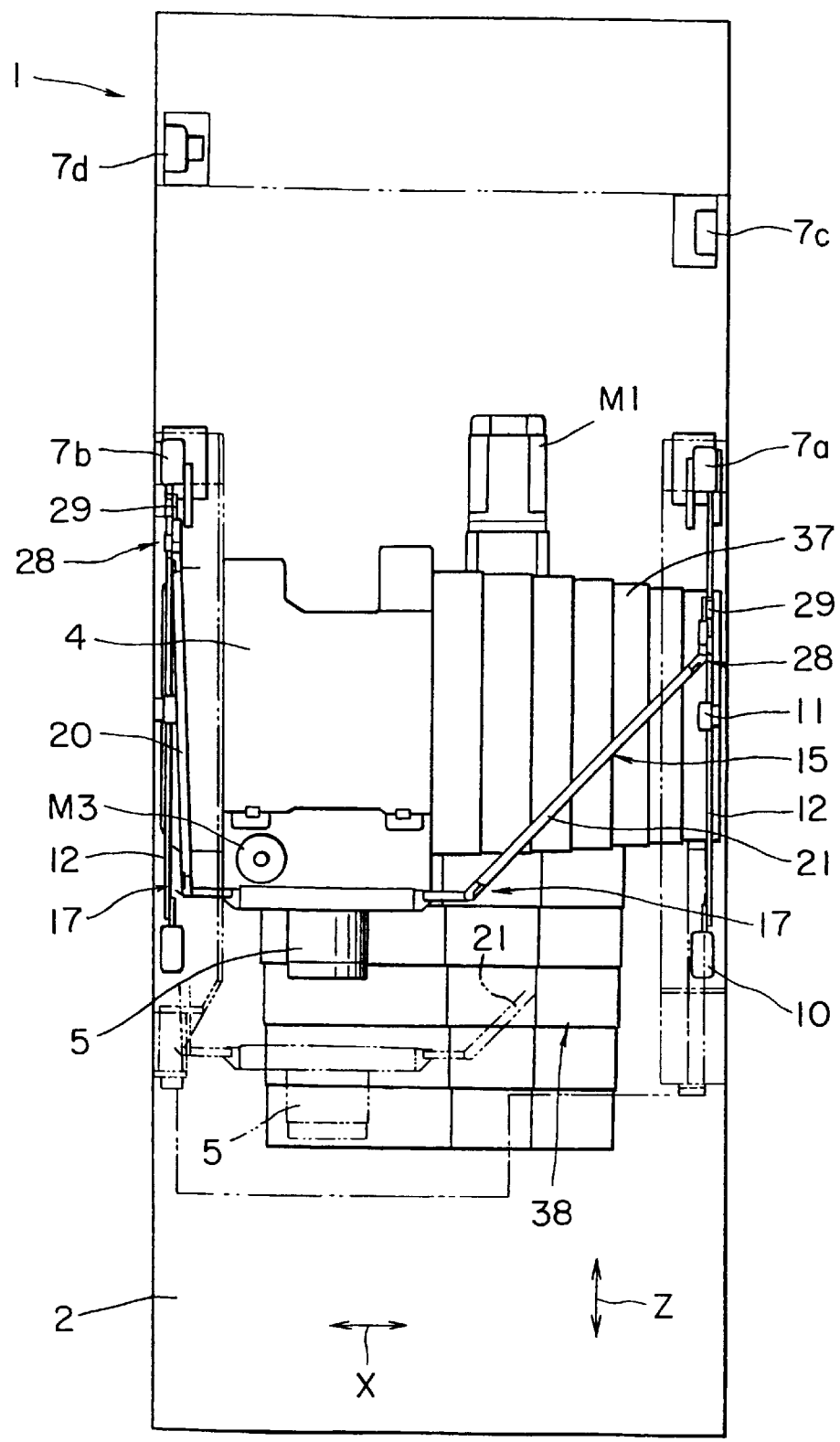
F I G. 1

COVER DEVICE FOR MACHINE TOOL

BACKGROUND OF THE INVENTION

1. Field of the Invention

The present invention relates to a cover device for a machine tool having a column capable of moving along the X-axis (transverse axis), to divide spaces on the right and the left side of the column into front and rear parts with respect to the column.

2. Description of the Related Art

A machine tool, such as a machining center, has a base, a column set up on the base so as to be able to move along the X-axis (transverse axis) and along the Z-axis (longitudinal axis), and a sliding cover device. The sliding cover device has telescopic cover units covering the right and the left side of the column, capable of moving together with the column and dividing spaces on the right and the left side of the column into front and rear parts with respect to the column to prevent chips and the cutting fluid from scattering. Cover devices of this kind are disclosed in JP-A 9-225777 published in 1997 and 10-138085 published in 1998. The telescopic cover unit of the sliding cover device is formed by successively overlapping cover plates of similar shapes so as to slide relative to each other and is capable of extending and contracting along the X-axis. The telescopic cover unit is mounted together with the column on a Z-axis slider capable of moving along the Z-axis. When the column moves along the X-axis, the telescopic cover unit extends or contracts accordingly. When the Z-axis slider moves along the Z-axis, the telescopic cover unit moves together with the column. The sliding cover unit prevents chips and the like from scattering into a space behind the column.

While the telescopic cover unit of the prior art cover device is formed by successively overlapping the plurality of cover plates and is capable of extending and contracting along the X-axis to prevent chips and the like from scattered behind the column, the telescopic cover unit is complicated in construction, heavy and expensive. Adjacent cover plates of the telescopic cover unit slide relative to each other, strike against each other and generate large noise when the telescopic cover unit extends or contracts as the column moves along the X-axis. The telescopic cover unit disclosed in JP Patent No. 2527920 published on Jun. 14, 1996 is provided with a pantographic mechanism to reduce noise that may be generated when the telescopic cover unit extends or contracts. The pantographic mechanism makes the construction of the telescopic cover unit further complicated and increases the cost of the cover device. Since the telescopic cover unit is mounted together with the column on the Z-axis slide, the Z-axis slide must bear the weight of both the heavy telescopic cover unit and the column. The heavy load on the Z-axis slide is an impediment to the enhancement of the moving speed of the Z-axis slide.

Accordingly, it is an object of the present invention to provide a lightweight cover device for a machine tool, simple in construction, capable of moving together with an associated column without generating large noise, and inexpensive.

SUMMARY OF THE INVENTION

According to the present invention, there is provided a cover device for a machine tool having a base and a column capable of moving at least in transverse directions on the base, to divide right and left spaces, with respect to the transverse directions, on the right and the left side of the column into a front and a rear part. The cover device comprises a right cover plate disposed on the right side of the column and having a front end part pivotally joined to the column and a rear end part pivotally joined to a right carriage capable of longitudinal movement on the base, and a left cover plate disposed on the left side of the column and having a front end part pivotally joined to the column and a rear end part pivotally joined to a left carriage capable of longitudinal movement on the base.

Preferably, the cover device is provided with joint covers for covering the joint of the column and the right cover plate and the joint of the column and the left cover plate.

More concretely, the respective front end parts of the right and the left cover plate are connected by hinges to right and left side surfaces of the column, respectively, so that gaps are formed between the column and the right and the left cover plate, and the right and the left cover plate are turnable on the hinges, respectively, and gaps between the column and the right and the left cover plate and the hinges connecting the right and the left cover plate to the column are covered with joint covers, respectively.

Preferably, the carriages are guided by guide rails fixedly supported on the base.

Preferably, each of the carriages is provided with a plurality pairs of wheels disposed in contact with opposite guide surfaces of the guide rail, and the carriages are provided with chip recarriages for preventing chips from being caught between the wheels and the guide rails.

Thus the cover device has the right and the left cover plate respectively having inner ends pivotally connected to the column and outer ends pivotally connected to the carriages so as to divide spaces on the right and the left side of the column into front and rear parts. The cover device is simple in construction and lightweight as compared with the conventional cover device having the telescopic cover units, and only part of the weight of the right and the left cover plate is loaded on the column. Consequently, the column can be used at an increased moving speed without employing a drive motor having an increased output capacity, and the cover device does not generate noise when the column is moved.

The above and other objects, features and advantages of the present invention will become more apparent from the following description taken in connection with the accompanying drawings.

BRIEF DESCRIPTION OF THE DRAWINGS

FIG. 1 is a plan view of a machine tool provided with a cover device in a first embodiment of the present invention;

DESCRIPTION OF THE PREFERRED EMBODIMENTS

Preferred embodiments of the present invention will be described with reference to the accompanying drawings.

Figure 2:
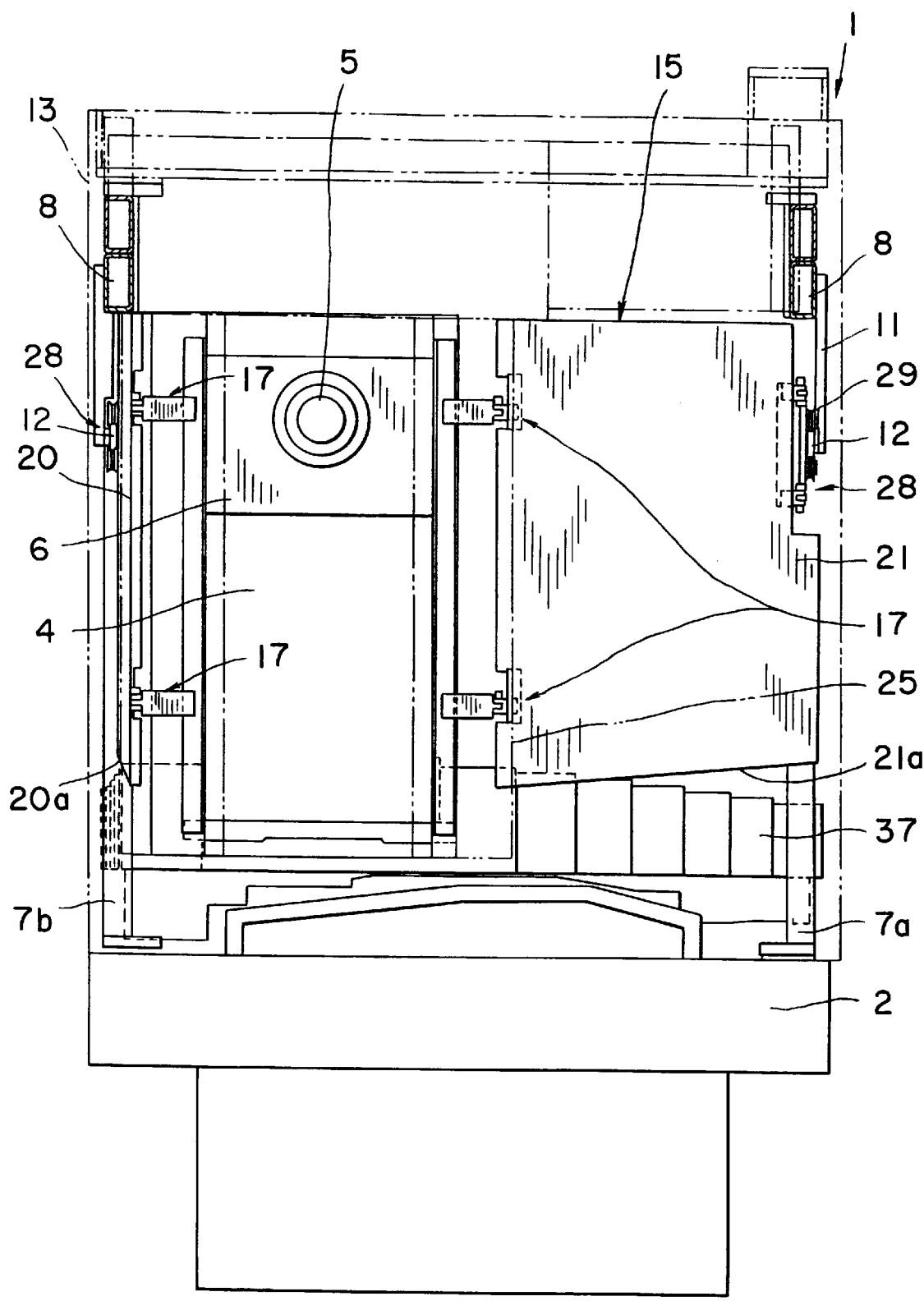
FIG. 2 is a front elevation of the machine tool shown in FIG. 1.
Figure 3:
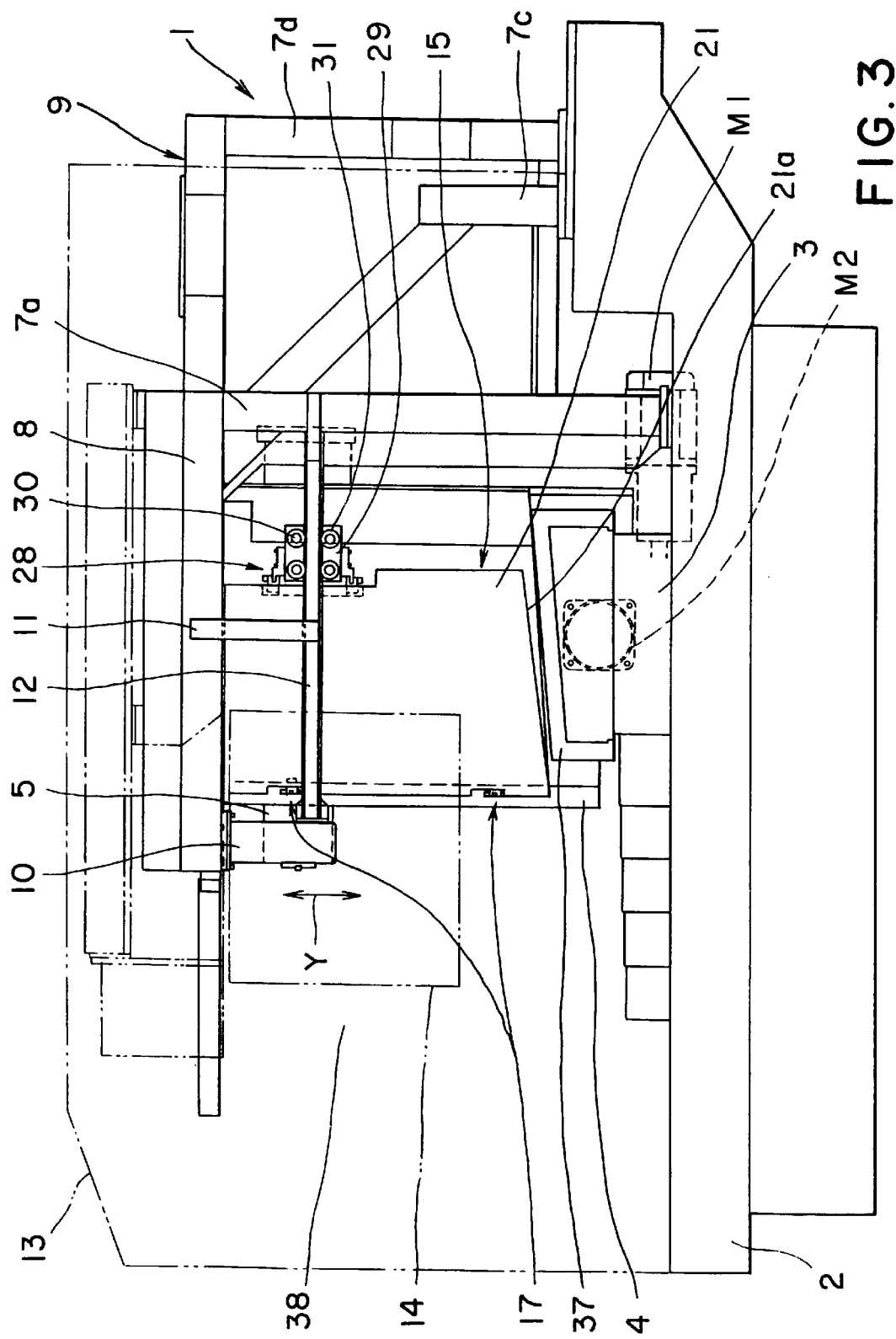
FIG. 3 is a side elevation of the machine tool shown in FIG. 1.

Referring to FIGS. 1 to 3, a machining center (machine tool) 1 has a Z-axis slide base 3 supported for sliding on a base 2. A motor M1 (FIG. 1) drives the Z-axis slider 3 for longitudinal movement along the Z-axis on the base 2. A column 4 is set up on the slider 3. A motor M2 (FIG. 3) drives the column 4 for transverse movement along the X-axis on the slide base 3. A spindle stock 6 provided with a spindle 5 for holding a tool is supported on the column 4. A motor M3 (FIG. 1) drives the spindle stock 6 for vertical movement along the Y-axis on the column 4. As shown in FIG. 1, four posts 7a, 7b, 7c and 7d are set upright on the upper surface of the base 2. Right and left cross rails 8 are connected longitudinally to the upper ends of the posts 7a, 7b, 7c and 7d to form a frame 9. An automatic tool changing mechanism (ATC mechanism), not shown, provided with a tool magazine that holds tools is mounted on the cross rails 8. A front end support member 10 and an intermediate support member 11 are extended vertically downward from each of the right and the left cross rail 8. Right and left guide rails 12 have front end parts joined to the lower ends of the front end support members 10, intermediate parts joined to the lower ends of the intermediate support members 11, and rear end parts joined to the posts 7a and 7b, respectively. A machine cover 13 (FIGS. 2 and 3) for entirely covering the frame 9 is mounted on the base 2. A door 14 (FIG. 3) is supported on a side wall of the machine cover 13.

Figure 4:
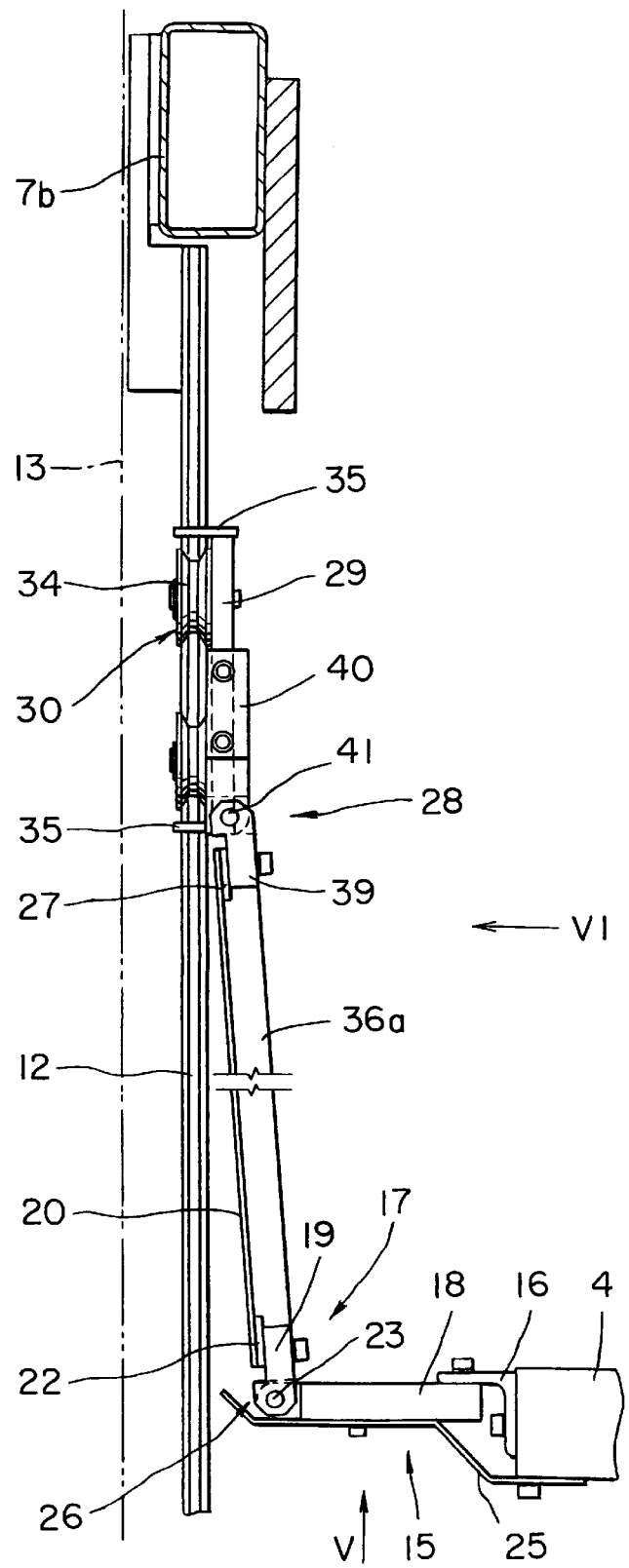
FIG. 4 is a plan view of a left cover unit.
Figure 5:
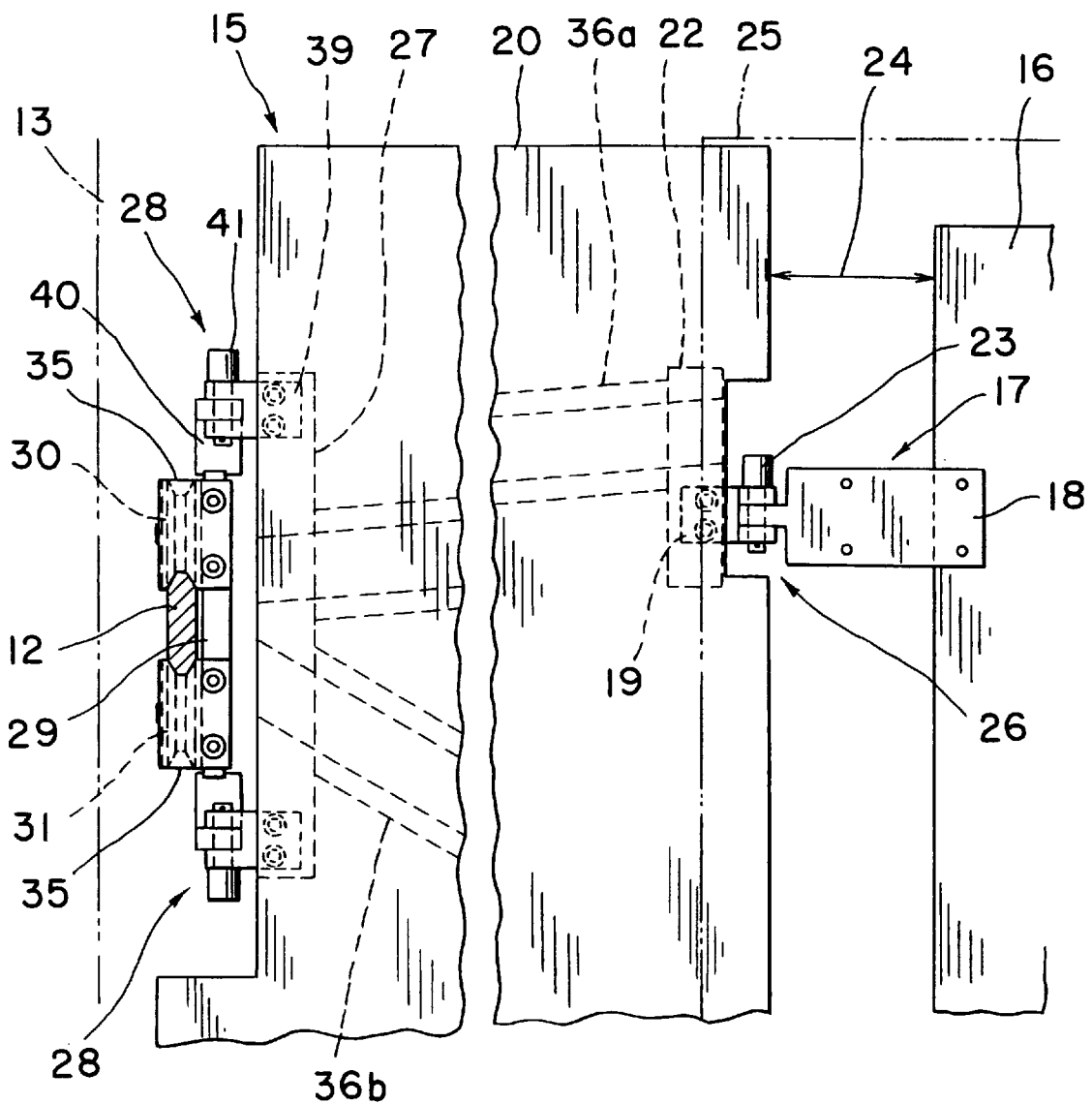
FIG. 5 is a view taken along the direction of the arrow V in FIG. 4.

As shown in FIGS. 4 to 6, a cover device in a first embodiment of the present invention has right and left cover mechanisms 15 disposed respectively on the right and the left side of the column 4. In FIGS. 4 to 6, only the left cover mechanism 15 is shown. The right and the left cover mechanisms 15 are symmetrical with respect to the column 4 and are substantially the same in construction. Brackets 16 having an L-shaped cross section are attached to the right and the left side surface of the column 4, respectively, as shown in FIG. 4. First hinge leaves 18 of hinges 17 are attached to upper parts and lower parts of the brackets 16, respectively. Second hinge leaves 19 of the hinges 17 are attached to hinge bases 22 welded to the back surfaces of inner end parts of a right cover plate 21 and a left cover plate 20, respectively. The hinge leaves 18 and 19 of the hinges 17 are joined together pivotally with pintles 23, respectively. Thus, the cover plates 20 and 21 are able to swing on the hinges 17 relative to the column 4. Gaps 24 are formed between the column 4 and the cover plates 20 and 21 as shown in FIG. 5. Joint covers 25 are fastened to the front surface of the column 4 and the front surfaces of the first hinge leaves 18 to cover the gaps 24. As shown in FIG. 2, the joint covers 25 are formed in a height substantially equal to the distance between the upper and the lower end of the column 4 and in a width sufficient to cover a region between the right and the left side of the column and joints 26 formed by joining the knuckles of the leaves 18 and 19 of the hinges 17 with the pintles 23. Thus, the cover plates 20 and 21 prevent chips from scattering into a space behind the column 4 and from being caught in the joints 26.

Referring to FIGS. 4 to 6, outer ends of the cover plates 20 and 21 are connected to carriages 29 by hinges 28. Each hinge 28 has a first leaf 39 and a second leaf 40, and knuckles of the first leaf 39 and the second leaf 40 are joined pivotally together by a pintlet 41. The first leaves 39 of the hinges 28 are attached to hinge bases 27 welded to the back surfaces of the cover plates 20 and 21. The second leaves 40 of the hinges 28 are attached to the upper and the lower end of the carriages 29, respectively. As shown in FIG. 1, the carriages 29 lie behind a plane including the front surface of the column 4, and the cover plates 20 and 21 extend backward from the column 4 in directions away from each other.

Figure 6A:
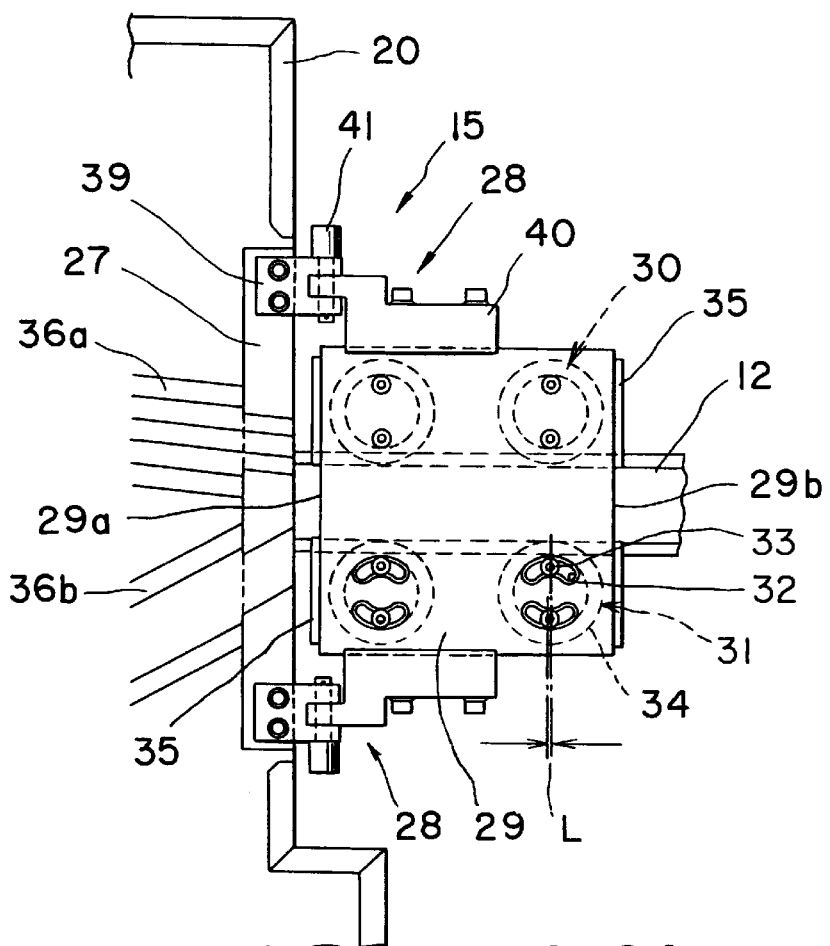
FIG. 6A is a view taken along the direction of the arrow VIA in FIG. 4.
Figure 6B:
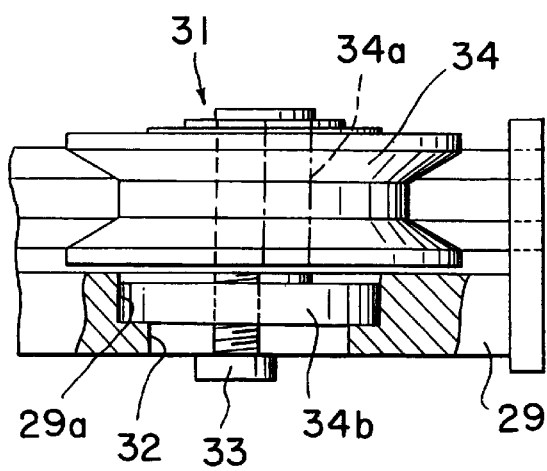
FIG. 6B is a partly sectional plan view of a lower wheel supported on a moving member.
Figure 6C:
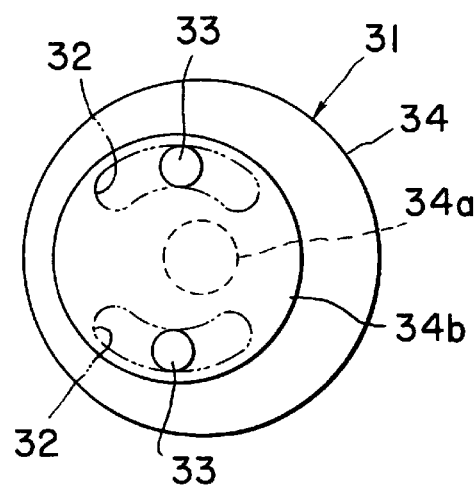
FIG. 6C is a front elevation of the lower wheel.

Each carriage 29 is provided with a plurality of pairs of wheels 30 and 31 (in this embodiment, two pairs of wheels). The wheels 30 and 31 are in contact with the upper and the lower surface of the guide rail 12, respectively. The wheels 30 and 31 has a disk 34b and a rolling member 34 supported for rotation on a shaft 34a. The disks 34b of the wheels 30 and 31 are fastened to the carriage 29 with bolts 33. As shown in FIGS. 6A to 6C, each lower roller 31 has the rolling member 34, and the disk 34b eccentrically combined with the rolling member 34 and fixed to the shaft 34a supporting the rolling member 34. The disk 34b is fitted in a circular recess 29a formed in the carriage 29. Each lower wheel 31 is fixedly supported on the carriage 29 with the bolts 33 passed through arcuate slots 32 formed in the carriage 29 and screwed in threaded holes formed in the disk 34b. The center of a circle including the arcuate slots 32 is dislocated from the center of rotation of the rolling member 34 of the lower wheel 31 by an appropriate eccentric distance L. The position of the lower wheel 31 relative to the guide rail 12 can therefore be adjusted by loosening the bolts 33 and moving the bolts 33 along the arcuate slots 32. Thus, each pair of rollers 30 and 31 can be set in exact contact with the guide rail 12 so that there is no play between the wheels 30 and 31, and the guide rail 12. Scrapers (chip removing members) 35 are attached to the front surface 29a and the rear surface 29b of each carriage 29 at positions corresponding to the rollers 30 and 31. The scrapers 35 slides along the guide rail 12 to scrape chips off the guide rail 12 when the carriage 29 moves along the guide rail 12 in order that chips may not be caught between the guide rail 12 and the rollers 30 and 31.

Figure 7:
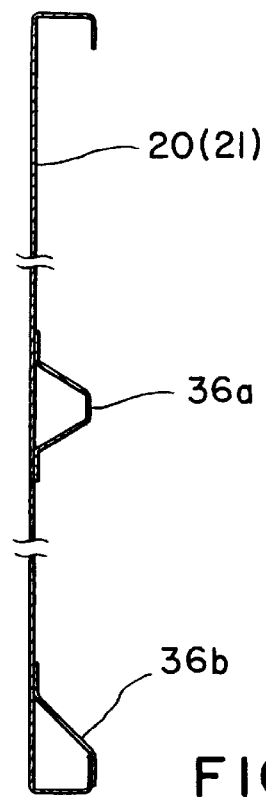
FIG. 7 is a longitudinal sectional view of a cover plate.
Figure 8:
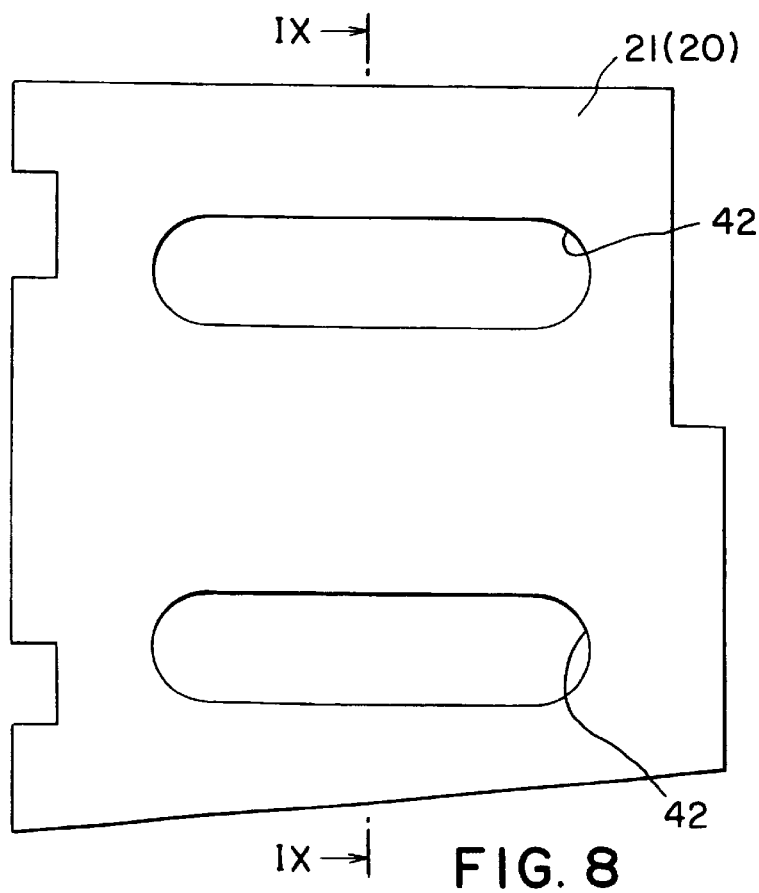
FIG. 8 is a plan view of a cover plate in a modification.
Figure 9:
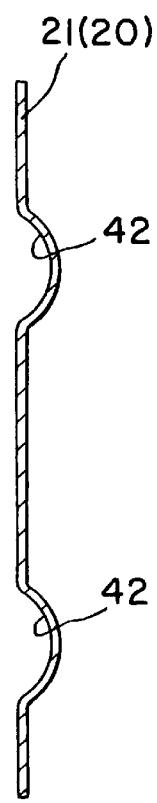
FIG. 9 is a sectional view taken on line IX—IX in FIG. 8.

As shown in FIG. 7, the cover plate 20 (21) is formed by bending a plate, and elongated reinforcing members 36a and 36b are attached to the back surface of the cover plate 20 (21). Since the cover plate 20 (21) is formed by processing a single plate, the cover plate 20 (21) is very light as compared with a stretchable telescopic cover unit constructed by slidably overlapping a plurality of cover plates of similar shapes. Unlike the telescopic cover unit in which the similar cover plates strike against each other to generate noise, the cover plate 20 (21) is a single member not having any other member against which the cover plate 20 (21) will strike and is capable of turning on the hinges 17 and 18 without generating noise. As indicated in FIG. 2, the lower edge 20a (21a) of the cover plate 20 (21) is inclined upward in a direction away from the side surface of the column 4 so that the cover plate 20 (21) may not interfere with a telescopic cover unit 37 capable of extending and contacting along the X-axis. The cover plates 20 and 21 may be provided with integral ribs 42 as shown in FIGS. 8 and 9 instead of the reinforcing members 36a and 36b.

The operation of the cover device will be described hereafter. Supposing that the column 4 moves to the left, as viewed in FIG. 2 (upward as viewed in FIG. 4), the left cover plate 20 turns on the hinges 17 and 28 relative to the column 4 and the carriage 29 to decrease the angle between the left side surface of the column 4 and the left cover plate 20 and to force the left carriage 29 to move backward (upward as viewed in FIG. 4) along the guide rail 12. Meanwhile, the right cover plate 21 turns on the hinges 17 and 28 relative to the column 4 and the carriage 29 to increase the angle between the right side surface of the column 4 and the right cover plate 21 and to force the right carriage 29 to move forward (downward as viewed in FIG. 4) along the guide rail 12. Eventually, the cover plates 20 and 21 extend as shown in FIG. 1 when the column 4 is moved to its left limit position. In the state shown in FIG. 1, the left cover plate 20 may be parallel to the left side surface of the column 4. If the column is moved longitudinally with the cover plates 20 and 21 extended as shown in FIG. 1, the carriages 29 will move along the guide rails 12 according to the movement of the column 4 without changing the angles between the left cover plate 20 and the left side surface of the column 4 and between the right cover plate 21 and the right side surface of the column 4. Thus, the cover plates 20 and 21 are translated from positions indicated by continuous lines to positions indicated by two-dot chain lines in FIG. 1. When the column 4 moves to the right, as viewed in FIG. 2 (to the right as viewed in FIG. 4), the cover plates 20 and 21 are reversed in their position.

Since the one ends of the cover plates 20 and 21 are connected to the column 4 and the other ends of the same are supported indirectly on the base 2, the weight of the cover plates 20 and 21 is distributed to the column 4 and the base 2. Consequently, all the weight of the cover plates 20 and 21 is not loaded through the column 4 on the Z-axis slide base 3 and hence the moving speed of the column 4 can be increased. The Z-axis slide base 3 and the column 4 can be driven for movement by a drive motor having a relatively small output capacity. The effect of the cover plates 20 and 21 in preventing chips and the cutting fluid from scattering into the space behind the column 4 while the machining center 1 is in a machining operation is the same as that of the conventional telescopic cover units.

The arrangement of the guide rails 12 above and along the right and left side edges of the base 2 is advantageous in that the guide rails 12 allow the carriages 29 to slide therealong within thin spaces located above the side edges of the base 2 whereby the movable range of the column 4 and the spindle 5 in the X-axis direction can be made large without increasing the width of the base 2 in the X-axis direction. In other words, the width of the base 2 can be made small for the movable range of the column 4 in the X-axis direction since the thin spaces within which the carriages 29 are movable allow provision of a usable space of the maximum width above the base 2.

Figure 10:
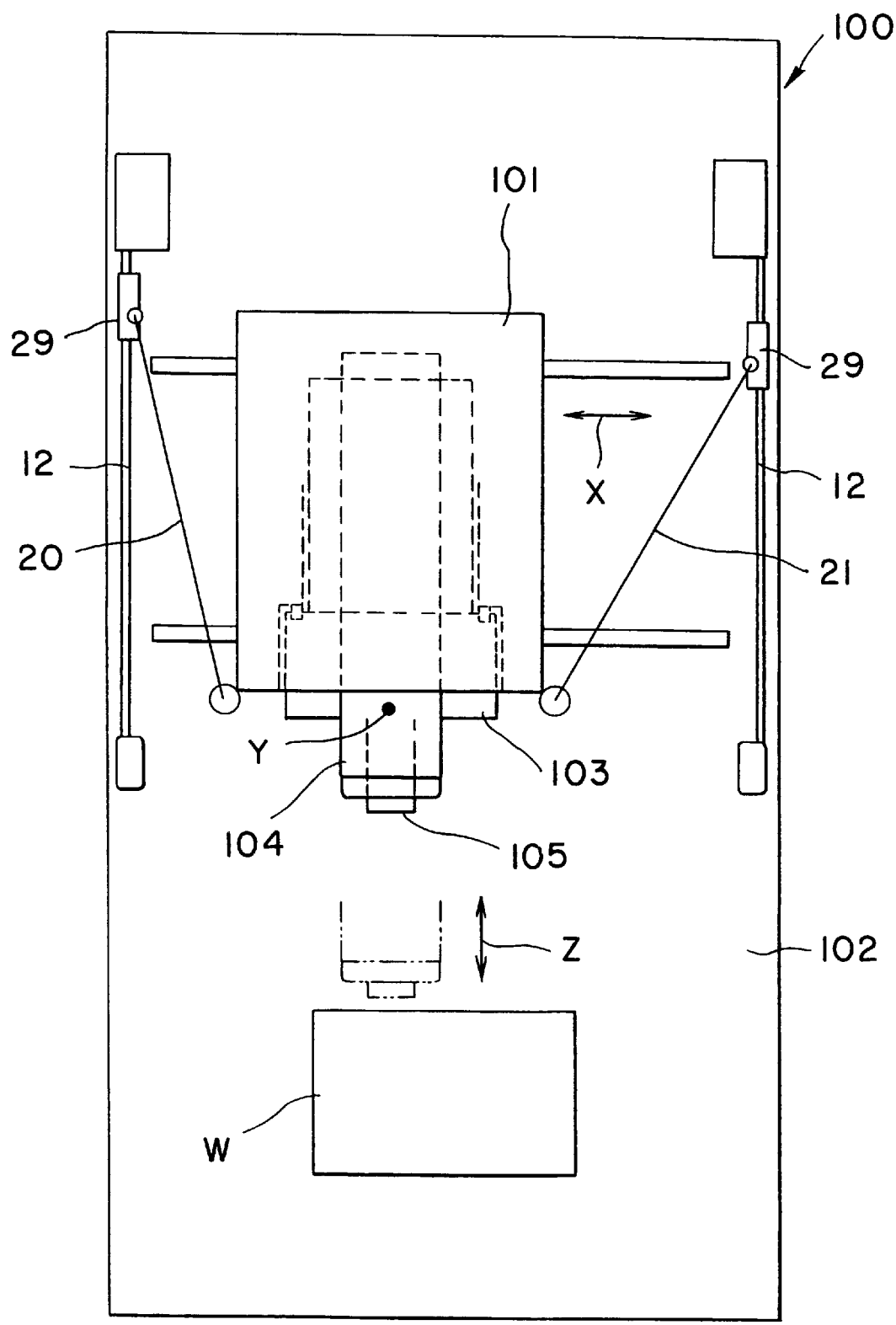
FIG. 10 is a plan view of a cover device in a second embodiment of the present invention.

Referring to FIG. 10 showing a cover device in a second embodiment of the present invention, a machine tool 100 has a bed 102, a column 101 supported on the bed 102 for only transverse movement in directions along the X-axis along rails laid on the bed 102. A spindle stock 103 is supported on the column 101 for vertical movement (movement along the Y-axis). A spindle unit 104 is supported on the spindle stock 103 so as to be longitudinally movable in directions along the Z-axis. A spindle 105 is supported for rotation in the spindle unit 104. The respective inner ends of cover plates 20 and 21 are connected to hinges connected to the opposite side surfaces of the column 101. The respective ends of the cover plates 20 and 21, similarly to the respective outer ends of the cover plates 20 and 21 of the cover device in the first embodiment, are connected pivotally to carriages 29 which move longitudinally along guide rails 12 supported on the bed 102. The angles between the right cover plate 21 and the right side surface of the column 101 and between the left cover plate 20 and the left side surface of the column 101 vary as the column 101 moves transversely. The cover plates divide spaces on the right and the left side of the column 101 into front and rear parts with respect to the column 101 to prevent chips produced by machining from scattering into the space behind the column 101.

A workpiece W may be moved toward and away from the spindle unit 104 instead of longitudinally moving the spindle unit 104, and the workpiece W may be vertically moved instead of vertically moving the spindle stock 103 relative to the column 101.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A cover device for a machine tool having a base and a column capable of moving at least in transverse directions on the base, to divide right and left spaces, with respect to the transverse directions, on the right and the left side of the column into a front and a rear part, said cover device comprising:

a right carriage capable of longitudinal movement on the base;

a left carriage capable of longitudinal movement on the base;

a right cover plate disposed on the right side of the column and having a front end part pivotally joined to the column and a rear end part pivotally joined to the right carriage; and a left cover plate disposed on the left side of the column and having a front end part pivotally joined to the column and a rear end part pivotally joined to the left carriage.

2. The cover device according to claim 1, further comprising joint covers for covering a joint of the column and the right cover plate and a joint of the column and the left cover plate.

3. The cover device according to claim 1, wherein the respective front end parts of the right and the left cover plate are connected by hinges to right and left side surfaces of the column, respectively, so that gaps are formed between the column and the right and the left cover plate, and the right and the left cover plate are turnable on the hinges, respectively, and gaps between the column and the right and the left cover plate and the hinges connecting the right and the left cover plate to the column are covered with joint covers, respectively.

4. The cover device according to claim 1, wherein the carriages are guided by guide rails fixedly supported on the base.

5. The cover device according to claim 4, wherein the guide rails extend above and along side edges of the base with respect to the transverse directions to provide a space of a maximum transverse width within which the column and other members related to the column are movable.

6. The cover device according to claim 1, wherein each of the carriages is provided with a plurality of pairs of wheels disposed in contact with opposite guide surfaces of the guide rail, and the carriages are provided with chip removing members for preventing chips from being caught between the wheels and the guide rails.

* * * * *